United States Patent
Shedletsky et al.

(10) Patent No.: US 6,701,728 B1
(45) Date of Patent: Mar. 9, 2004

(54) APPARATUS AND METHOD FOR RECOVERY AND RECYCLE OF OPTICAL FIBER COOLANT GAS

(75) Inventors: Igor Shedletsky, Staten Island, NY (US); André Micke, Summit, NJ (US); Yaping Lu, Scotch Plains, NJ (US)

(73) Assignee: The Boc Group, Inc., New Providence, NJ (US)

( * ) Notice: Subject to any disclaimer, the term of this patent is extended or adjusted under 35 U.S.C. 154(b) by 0 days.

(21) Appl. No.: 10/229,594

(22) Filed: Aug. 28, 2002

(51) Int. Cl.[7] .......................... F25B 45/00; F25B 43/04
(52) U.S. Cl. ........................ 62/149; 62/475; 62/292
(58) Field of Search ........................ 62/149, 475, 292, 62/77, 85, 474, 63, 608; 65/489

(56) References Cited

U.S. PATENT DOCUMENTS

| | | |
|---|---|---|
| 4,437,870 A | 3/1984 | Miller |
| 4,514,205 A | 4/1985 | Darcangelo et al. |
| 4,594,088 A | 6/1986 | Paek et al. |
| 4,664,689 A | 5/1987 | Davis |
| 4,838,918 A | 6/1989 | Vaughan et al. |
| 4,894,078 A | 1/1990 | Takimoto et al. |
| 4,913,715 A | 4/1990 | Jochem et al. |
| 5,160,359 A | 11/1992 | Strackenbrock et al. |
| 5,314,515 A | 5/1994 | Cain |
| 5,377,491 A | 1/1995 | Schulte |
| 5,452,583 A | 9/1995 | Schulte |
| 5,897,682 A | 4/1999 | Koaizawa et al. |
| 6,092,391 A | 7/2000 | Chludzinski |
| 6,125,638 A | 10/2000 | Ji et al. |
| 6,142,343 A | 11/2000 | Wade et al. |
| 6,142,393 A | 11/2000 | Kotyk |
| 6,223,919 B1 | 5/2001 | Kuehn |
| 6,345,451 B1 | 2/2002 | Arslanian et al. |

FOREIGN PATENT DOCUMENTS

EP   1 136 456 A2   9/2001

OTHER PUBLICATIONS

Volk, U.S. patent application Publication No. US 2001/0047722 A1, Pub Date: Dec. 6, 2001.

*Primary Examiner*—Chen Wen Jiang
(74) *Attorney, Agent, or Firm*—Philip H. Von Neida

(57) ABSTRACT

An apparatus and method for recovering and recycling a coolant gas from a heat exchanger. The apparatus comprises a coolant gas recovery section, and analysis section, and a coolant gas blending section. The coolant gas recovery section recovers a coolant gas containing contaminants from the heat exchanger. The analysis section monitors a condition of an analysis portion of the recovered coolant gas. The coolant gas blending section operates to produce, based on the condition of the recovered coolant gas monitored by the analysis section, a blend coolant gas comprising a virgin coolant gas and a reclaimed coolant gas that comprises at least a portion of the recovered coolant gas. The blend coolant gas has a predetermined contaminant concentration and is recycled into the heat exchanger. Thus, the coolant gas is recovered from, and recycled to, the heat exchanger at the predetermined contaminant concentration without using a purification device.

14 Claims, 3 Drawing Sheets

APPARATUS AND METHOD FOR RECOVERY AND RECYCLE OF OPTICAL FIBER COOLANT GAS

BACKGROUND OF THE INVENTION

1. Field of the Invention

The invention generally relates to a coolant recovery and recycling apparatus. In one aspect, the invention relates to a helium recovery and recycling apparatus associated with a heat exchanger.

2. Description of the Related Art

In the production of optical fibers, a glass rod or a "pre-form", which is especially made to manufacture optical fibers, is processed in an optical fiber drawing system. The optical fiber drawing system generally comprises a furnace, a heat exchanger, a coating applicator, a dryer or curing furnace, and a spool as illustrated in European Patent Application No. 0079188. Initially, the glass rod is melted in the furnace such that a small, semi-liquid fiber is produced. The semi-liquid fiber is then cooled and solidified while falling through the air and the heat exchanger. Thereafter, the cooled, solidified fiber can be coated in the coating applicator, dried in the curing furnace or dryer, and drawn with the spool.

The drawing rate of the optical fiber is generally dependent upon the cooling rate of the optical fiber in the heat exchanger. That is, the rate at which the fiber can be drawn increases as the rate at which the fiber can be cooled increases. To increase the cooling rate of the optical fiber, a direct heat exchange process is employed. In the direct heat exchange process, a coolant gas (e.g., helium, nitrogen, a helium-nitrogen mixture, a helium-air mixture, a helium-argon mixture, a helium-hydrogen mixture, a helium-inert gas mixture, and the like) is introduced into the heat exchanger where the coolant gas directly encounters and cools the semi-liquid fiber.

Typically, the heat exchanger comprises a passageway (e.g., generally of a cylindrical configuration) having end openings (e.g., a fiber inlet and a fiber outlet) for receiving and expelling the optical fiber, one or more coolant gas inlets for receiving the coolant gas, and one or more coolant gas outlets for discharging the coolant gas. The passageway generally extends from one end opening proximate a top of the heat exchanger to another end opening proximate a bottom of the heat exchanger. Thus, the passageway provides a corridor through which the optical fiber can pass. The coolant gas inlet (or inlets) can introduce coolant gas into the passageway while the coolant gas outlet (or outlets) can remove the coolant gas from the passageway. In a conventional system, a rate of flow of the coolant gas into the heat exchanger is manipulated and/or controlled with metering valves and flow meters.

If any of the spent coolant gas is recovered from the heat exchanger, typically proximate the outlet, the recovered coolant gas will typically be entrained with and/or carry impurities, debris, and the like (collectively "contaminants"). Typical contaminants include gases (e.g., nitrogen, oxygen, argon, and other gases present in the atmosphere), particulate substances (e.g., dust), and moisture. These contaminants can infiltrate the passageway, coolant gas inlet, and/or coolant gas outlet of the heat exchanger. The contaminants can collect and increase in concentration in the recovered coolant gas. The amount and/or concentration of contaminants in the recovered coolant gas can limit and/or restrict the amount of coolant gas that can be recycled and reused.

In order to reduce the amount and/or concentration of contaminants in the recovered coolant gas, a variety of solutions for decontaminating and/or purifying the coolant gas have been suggested. Coolant gas purification devices, systems, and/or methods are often employed. Such purification devices and/or methods are intended to remove some of the contaminants from the recovered coolant gas so that at least a portion of the recovered coolant gas can be recycled. However, the use of purification devices can represent a substantial expense in the optical fiber manufacturing process.

Unfortunately, without using a purification device, the amount of impurities contained within the recovered coolant gas can be substantial. As attempts are made to recycle more of the recovered coolant gas, the contaminant concentration within the recovered coolant gas can resultantly increase. Therefore, a diminishing amount of recovered coolant gas can be available for recycling.

Thus, an efficient and less complex apparatus and method for recovering and recycling coolant gas would be desirable.

SUMMARY OF THE INVENTION

In one aspect, the invention provides a method of recovering and recycling a coolant gas containing contaminants. The method comprises providing a heat exchanger and an analyzer, the heat exchanger and the analyzer in operational association. The coolant gas containing contaminants is recovered from the heat exchanger and an analysis portion of the recovered coolant gas is delivered to the analyzer. Thereafter, the analysis portion of the recovered coolant gas is analyzed with the analyzer to determine a condition of the recovered coolant gas. Then, based on the condition, a reclaimed portion of the recovered coolant gas is blended with a virgin coolant gas to produce a gaseous coolant blend having a predetermined contaminant concentration. The gaseous coolant blend is introduced into the heat exchanger such that at least a portion of the recovered coolant gas is recycled.

In one embodiment, a method of recovering and recycling a coolant gas containing contaminants is employed. The method comprises providing a heat exchanger and an analyzer, the heat exchanger and analyzer in operational association. The coolant gas containing contaminants is recovered from the heat exchanger and an analysis portion of the recovered coolant gas is delivered to the analyzer. Thereafter, the analysis portion of the recovered coolant gas is analyzed with the analyzer to determine a condition of the recovered coolant gas. Then, based on the condition, a reclaimed portion of the recovered coolant gas is blended with a virgin coolant gas to produce a gaseous coolant blend having a predetermined contaminant concentration. The gaseous coolant blend is introduced into the heat exchanger such that at least a portion of the reclaimed recovered coolant gas is recycled. In this embodiment, the reclaimed recovered coolant gas is recycled as opposed to the recovered coolant gas.

In another embodiment, a method of controlling a contaminant concentration in a gaseous coolant blend provided to a heat exchanger is taught. The method comprises providing the heat exchanger and an analyzer, the heat exchanger and the analyzer in operational association. A coolant gas containing contaminants is recovered from the heat exchanger and an analysis portion of the recovered coolant gas is delivered to the analyzer. Thereafter, the analysis portion of the recovered coolant gas is analyzed with the analyzer to determine the contaminant concentration within the recovered coolant gas. Then, based on the contaminant concentration, a reclaimed portion of the recovered coolant gas and a virgin coolant gas are blended to produce the gaseous coolant blend. The reclaimed portion of the recovered coolant gas is recycled by introducing the gaseous coolant blend into the heat exchanger such that the contaminant concentration in the gaseous coolant blend provided to the heat exchanger is controlled.

In a further aspect, the invention provides an apparatus for use with a heat exchanger. The apparatus comprises a coolant recovery section, an analysis section, and a coolant gas blending section. The coolant recovery section is for recovering a coolant gas containing contaminants from the heat exchanger. The analysis section is operable to monitor a condition of the recovered coolant gas. The coolant gas blending section, in operational association with the coolant gas recovery section and the analysis section, is operable to produce, based on the condition of the recovered coolant gas, a gaseous coolant blend having a predetermined contaminant concentration from a virgin coolant gas and a reclaimed portion of the recovered coolant gas.

In one embodiment, an apparatus for recovering a coolant gas containing contaminants from a heat exchanger and recycling at least a portion of the recovered coolant gas is disclosed. The apparatus comprises a pump operable to recover the coolant gas from the heat exchanger and to transport the recovered coolant gas through the apparatus and an analyzer operable to monitor a condition of the recovered coolant gas. The apparatus also comprises a first mass flow controller operable to reclaim a portion of the recovered coolant gas by delivering the reclaimed portion of the recovered coolant gas to a mixing point, a second mass flow controller operable to provide a virgin coolant gas to the mixing point, and a third mass flow controller operable to maintain a flow of the recovered coolant gas through the apparatus. As such, the apparatus is operable to produce, based on the condition of the recovered coolant gas, a gaseous coolant blend from the virgin coolant gas and the reclaimed portion of the recovered coolant gas. Thus, the gaseous coolant blend has a predetermined contaminant concentration when the gaseous coolant blend is introduced into the heat exchanger.

In yet another aspect, the invention provides a coolant gas recovery system that comprises a coolant gas for cooling a hot fiber, a heat exchanger, a pump for pumping and drawing the coolant gas through the system, an analyzer for monitoring an impurity concentration in the coolant gas, a first mass flow controller and a second mass flow controller for controlling the impurity concentration in the coolant gas based on the monitored impurity concentration, and a third mass flow controller for providing a seal to the heat exchanger using the coolant gas and for maintaining a constant flow of the coolant gas to ensure continuous operation of the pump.

The heat exchanger includes a fiber inlet, a fiber outlet, a passageway, one or more coolant gas inlets, and one or more coolant gas outlets. The fiber inlet is adapted to receive the hot fiber into the heat exchanger and the fiber outlet is adapted to expel the hot fiber from the heat exchanger. The passageway extends between the fiber inlet and fiber outlet and is adapted to pass therethrough the hot fiber. The coolant gas inlets are for introducing a coolant gas into the passageway and the coolant gas outlets are for removing the coolant gas from the passageway.

BRIEF DESCRIPTION OF THE DRAWINGS

Embodiments of the invention are disclosed with reference to the accompanying drawings and are for illustrative purposes only. The invention is not limited in its application to the details of construction, or the arrangement of the components, illustrated in the drawings. The invention is capable of other embodiments or of being practiced or carried out in other various ways. Like reference numerals are used to indicate like components throughout the drawings.

DETAILED DESCRIPTION OF THE PREFERRED EMBODIMENTS

Various items of equipment, such as fittings, valves, mountings, pipes, wiring, and the like have been omitted to simplify the description. However, such conventional equipment and its uses are known to those skilled in the art and can be employed as desired. Moreover, although the present invention is described below in the context of recovering and recycling a coolant gas, the invention can be employed with, and has applicability to, many different recovery and/or recycling apparatuses and processes.

Figure 1:
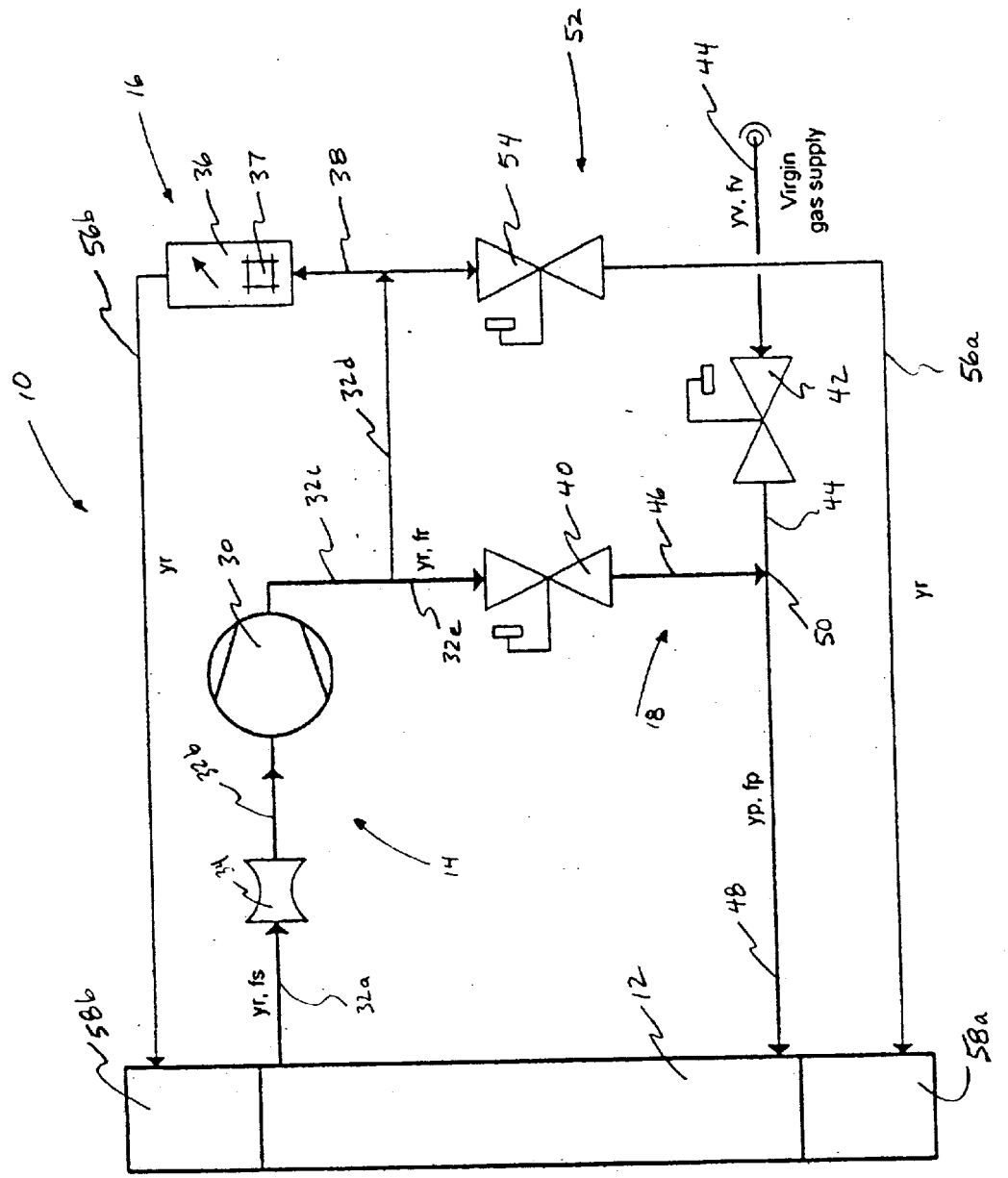
FIG. 1 illustrates a schematic flow diagram of an embodiment of a coolant gas recovery and recycling system according to one aspect of the invention.

Referring to FIG. 1, a system 10 for recovering and recycling a coolant gas, such as helium, nitrogen, a helium-nitrogen mixture, a helium-air mixture, and the like is shown. System 10 comprises heat exchanger 12, coolant gas recovery section 14, analysis section 16, and coolant gas blending section 18, which are in operational association with each other.

Figure 2:
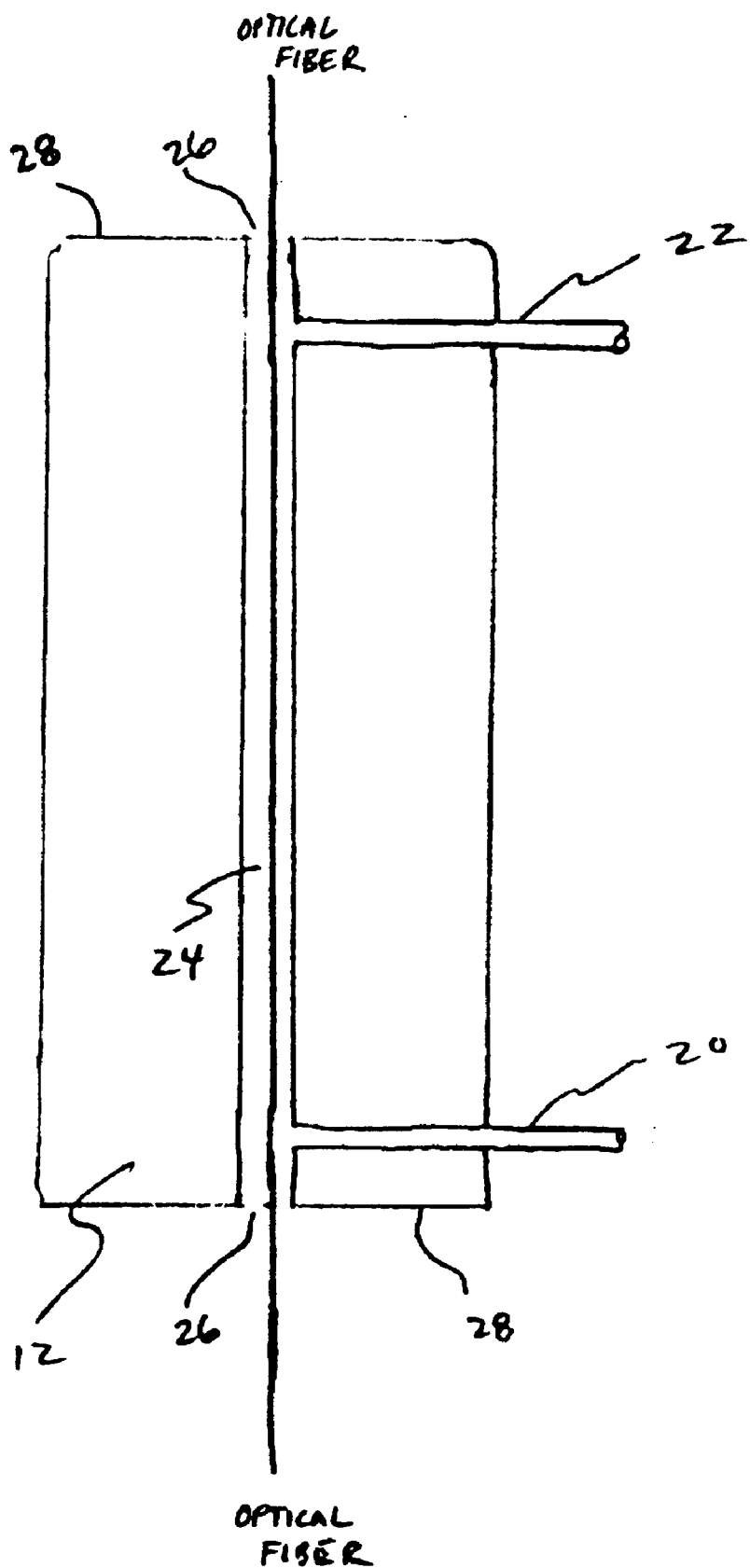
FIG. 2 illustrates a heat exchanger that can be employed within the system of FIG. 1.

Heat exchanger 12, as shown in detail in FIG. 2, can include a variety of heat exchangers (e.g., direct heat exchanging or like devices) known in the art that are capable of accepting, receiving, and/or processing a hot optical fiber, a semi-liquid fiber, and the like. As shown in FIG. 2, heat exchanger 12 comprises coolant gas inlet 20, coolant gas outlet 22, passageway 24, and end openings 26 (e.g., a fiber inlet and a fiber outlet). While heat exchanger 12 can include one or more coolant gas inlets 20 and one or more coolant gas outlets 22, for purposes of illustration, only a single coolant gas inlet and a single coolant gas outlet are shown in FIG. 2.

Coolant gas inlet 20 is configured to accept delivery and/or introduction of coolant gas into heat exchanger 12 while coolant gas outlet 22 is configured to remove, expel, and/or permit recovery of the coolant gas from the heat exchanger. Passageway 24 can be formed through heat exchanger 12 and extend between end openings 26 at opposing ends 28 of the heat exchanger. End openings 26 are structured to receive and discharge the hot optical fiber from heat exchanger 12. Therefore, passageway 24 and end openings 26 provide the hot optical fiber with a path, corridor, and/or route in which to pass through heat exchanger 12. Thus, the coolant gas can be introduced into heat exchanger 12 at coolant gas inlet 20, can flow through or circulate throughout passageway 24, and can cool the hot optical fiber. Thereafter, the coolant gas can be removed, drawn, and/or recovered from the heat exchanger at coolant gas outlet 22.

Often, coolant gas that is recovered from heat exchanger 12 contains contaminants such as impurities, debris, and the like, (collectively "contaminants"). These contaminants typically comprise gases (e.g., nitrogen, oxygen, argon, and other gases present in the atmosphere), particulate substances (e.g., dust), and moisture. However, contaminants can include any substance other than the coolant gas and can exist within the recovered coolant gas in varying amounts and at varying concentrations.

In contrast to recovered coolant gas, "virgin" coolant gas is coolant gas that contains little, if any, contaminants. Virgin coolant gas such as, for example, an industrial grade virgin coolant gas, typically contains no more than about 0.005 percent contaminants by volume.

Referring back to FIG. 1, coolant gas recovery section 14 includes pump 30, recovery lines 32, and optionally orifice 34 or a like de-coupling device and/or flow restrictor. Pump 30 is operable to produce both a negative and a positive pressure within system 10. For example, pump 30 can produce or create the negative pressure in recovery lines 32a and 32b such that the coolant gas within heat exchanger 12 can be drawn from the heat exchanger and recovered. Also, pump 30 can produce or create positive pressure in one or more lines (i.e., 32c, 32d, and 32e) and elsewhere within system 10, such that the coolant gas can be pushed or flowed throughout the system. Any pump capable of producing the negative and/or positive pressures described above can be employed as pump 30.

Since pump 30 is operable to generate both negative and positive pressures, additional pumps, a compressor, and the like are not needed within system 10. The level and/or amount of positive pressure generated by pump 30 can be dependent upon the amount of the coolant gas flowing through system 10 and/or flow restrictions provided by components of the system.

Orifice 34 is disposed within system 10, and coolant gas recovery section 14, such that the orifice can de-couple heat exchanger 12 from pump 30. Orifice 34 is also capable of controlling and/or reducing the effects of pressure differentials within heat exchanger 12. These pressure differentials are created by pump 30 as the pump operates to produce both positive and negative pressures within system 10. If not controlled, the pressure differentials (i.e., fluctuations in pressure) can produce undesirable fiber vibrations. Undesirable fiber vibrations can adversely affect the fiber-drawing process and the quality of the optical fiber that is produced.

Analysis section 16 includes an analyzer 36 and analysis line 38. Analyzer 36 can comprise one or more of a variety of analyzers or monitors known in the art such as, for example, an oxygen analyzer, a helium analyzer, a nitrogen analyzer, a moisture analyzer, and the like. Analyzer 36 can be associated, though recovery lines 32 and analysis line 38, with heat exchanger 12 such that the analyzer is operable to monitor a condition of the recovered coolant gas (or an analysis portion of the recovered coolant gas) drawn from the heat exchanger. Conditions of the recovered coolant gas that can be monitored include, but are not limited to, an amount and/or concentration of oxygen, an amount and/or concentration of helium, an amount and/or concentration of nitrogen, an amount and/or concentration of another inert gas, and an amount of moisture in the recovered coolant gas.

Preferably, analyzer 36 is operationally associated with a control system 37. Control system 37 is operable to relay and/or transmit the condition monitored by the analyzer to one or more components of system 10 (e.g., mass flow controllers, flow controllers, valves, and the like). Control system 37 can further operate to instruct and/or control one or more mass flow controllers, based on the monitored, relayed, and/or transmitted condition, regarding flow rates and other operational parameters.

Coolant gas blending section 18 includes flow or mass flow controllers 40 and 42, virgin line 44, reclaimed line 46, and blend line 48. Mass flow controller 40 is operable to permit or restrict a flow of the recovered coolant gas. Specifically, the recovered coolant gas can be selectively permitted to pass through mass flow controller 40 and into reclaimed line 46 whereby the recovered coolant gas is "reclaimed". The reclaimed coolant gas can then flow through reclaimed line 46 to mixing point 50.

Mass flow controller 42 is operable to permit or restrict a flow of the virgin coolant gas. Specifically, the virgin coolant gas can be permitted to pass through mass flow controller 42 and into virgin line 44. The virgin coolant gas can then flow through virgin line 44 to mixing point 50.

Mixing point 50, as shown in FIG. 1, occurs at the intersection of virgin line 44, reclaimed line 46, and blend line 48. At mixing point 50, the reclaimed coolant gas and the virgin coolant gas can be blended together to produce a mixture and/or blend of coolant gas at a predetermined and/or desired purity. In other words, the blend of coolant gas can be produced such that the blend has a predetermined, known, and/or desired contaminant concentration (collectively "predetermined contaminant concentration").

Typically, the predetermined contaminant concentration of the blend coolant gas is less than about five percent (5%) contaminants by volume of the blend coolant gas. Correspondingly, the coolant gas recycled by system 10 has a coolant gas concentration (i.e., purity) of about ninety-five to about ninety-nine percent (about 95 to about 99%) coolant gas by volume of the blend coolant gas. In preferred embodiments, the predetermined contaminant concentration and the coolant gas concentration in the blend coolant gas can be user defined.

In one embodiment, the predetermined contaminant concentration can be achieved by selectively operating mass flow controllers 40 and 42 to blend varying amounts of reclaimed coolant gas and virgin coolant gas together in an appropriate proportion. The blend coolant gas can be produced using this "blending" method since the contaminant concentration within the virgin coolant gas is generally known and the analyzer can determine the contaminant concentration within the recovered coolant gas.

Once the blend coolant gas is produced at mixing point 50, the blend coolant gas is passed through blend line 48 for introduction into heat exchanger 12. As such, the blend coolant gas, and more specifically the reclaimed portion of the recovered coolant gas, is "recycled". The heat exchanger can use the recycled coolant gas to cool a hot optical fiber as previously described and, since the blend coolant gas, which includes the reclaimed portion of the recovered coolant gas, is recycled and/or reused, a significant cost savings can be realized.

In preferred embodiments, system 10 also includes by-pass section 52. By-pass section 52 includes mass flow controller 54 and one or more seal lines 56a–b. Mass flow controller 54 is operable to permit or restrict a flow of the recovered coolant gas through seal line 56a. The recovered coolant gas can flow through analyzer 36, analysis line 38, and seal lines 56a–b until passing proximate ends 28 of heat exchanger 12 such that seals 58a–b are formed. Seals 58a–b can comprise, for example, a conventional gas seal. Thus, by-pass section 52 can inhibit and/or prevent undesirable escape of the coolant gas from within passageway 24 of heat exchanger 12 and, in doing so, utilize a portion of the recovered coolant gas.

In an exemplary embodiment, seals 58a–b comprise seals such as those described in commonly-owned, co-pending U.S. patent application Ser. No. 09/998,288 filed Nov. 30, 2001, entitled "Cap Assembly and Optical Fiber Cooling Process" and, therefore, the contents and disclosure of that application are incorporated into the present application by this reference as if fully set forth herein.

Further, by-pass section 52, and particularly mass flow controller 54, can operate to maintain a constant flow of at least a portion of the recovered coolant gas through system 10. The constant flow can resultantly ensure that pump 30 continually operates. With a continually operating pump 30, positive pressure generated by the pump, which transports the recovered, reclaimed, and blended coolant gas through system 10, can be maintained. By maintaining the positive pressure in system 10, "lag time" can be reduced. As used herein, lag time is essentially that amount of time that elapses while the recovered coolant gas progresses through system 10 (e.g., through lines 32d and 38 to reach analyzer 36).

Lag time is often undesirably noticed and/or experienced when diverting and/or redirecting flows of the coolant gas from line to line (e.g., 56 and 46) within system 10. For example, when mass flow controller 54 restricts the flow of a portion of the recovered coolant gas entering seal line 56a, and mass flow controller 40 simultaneously permits an increased flow of a portion of the recovered coolant gas through reclaimed line 46, lag time might be expected. However, because pump 30 has been continually operating, a build-up of positive pressure is not necessary to divert and/or redirect the recovered coolant gas. Therefore, the portion of the recovered coolant gas that had been entering seal line 56a can be quickly diverted to reclaimed line 46. When positive pressure within system 10 is not allowed to substantially dissipate as a result of the continuously and/or continually operating pump, lag time can be reduced.

Advantageously, by-pass section 52 can also inhibit and/or prevent accumulation of contaminants upstream of mass flow controller 40 that are caused by a decreasing flow of recovered coolant gas at an increasing concentration of the recovered coolant gas.

In operation, a coolant gas having contaminants is drawn (i.e., recovered) from heat exchanger 12 by operating pump 30. The recovered coolant gas enters recovery line 32a and flows through orifice 34, recovery line 32b, pump 30, and recovery line 32c. While progressing through recovery line 32c, the coolant gas having contaminants is divided and/or splits such that at least a portion of the recovered coolant gas flows through recovery line 32d and another portion flows through recovery line 32e.

Of the portion of the recovered coolant gas flowing through recovery line 32d, an analysis portion enters analysis line 38 and is introduced into analyzer 36 and a portion passes through mass flow controller 54. Preferably, the flow of the portions of recovered coolant gas through each of analyzer 36 and mass flow controller 54 are constant or substantially constant while the flow of recovered coolant gas through recovery line 32e and mass flow controller 40 is variable.

Positive pressure generated by pump 30 can be directly related and/or depend upon a combination of the flows of recovered coolant gas through analyzer 36 and mass flow controllers 40 and 54. In other words, pump 30 can operate to produce as much or as little positive pressure as needed depending on a summation of flow restrictions produced by analyzer 36 and mass flow controllers 40 and 54.

After the recovered coolant gas has been divided, analyzer 36 operates to monitor a condition of the analysis portion of the recovered coolant gas and, as such, can determine the contaminant concentration within the recovered coolant gas. Thereafter, analyzer 36 and/or control system 37 transmits and/or relays the concentration information to one or more of mass flow controllers 40, 42, and 54. Analyzer 36 and/or control system 37 can also, if desired, instruct and/or control one or more of mass flow controllers 40, 42, and 54 to manipulate flows of the recovered coolant gas.

Having determined the contaminant concentration of the recovered coolant gas with analyzer 36, and knowing the contaminant concentration within the virgin coolant gas, mass flow controller 40 and 42 are actuated and/or operated. When mass flow controller 42 is actuated, an amount of the virgin coolant gas travels through virgin line 44 and is delivered to mixing point 50. Also, when mass flow controller 40 is actuated, an amount of recovered coolant gas is permitted to pass through the mass flow controller such that the amount of the recovered coolant gas is reclaimed. The reclaimed coolant gas travels through reclaimed line 46 and is also delivered to mixing point 50.

At mixing point 50, the reclaimed coolant gas and the virgin coolant gas are blended and/or mixed together to produce the blend coolant gas (i.e., gaseous coolant blend) having the predetermined contaminant concentration or coolant gas purity. Thus, the quality of the coolant gas (i.e., the contaminant concentration or purity), as opposed to quantity (i.e., rate of flow) of the coolant gas, is manipulated and/or controlled by system 10, and particularly mass flow controllers 40 and 42.

After the blend coolant gas, at the predetermined concentration, has been produced, the blend coolant gas is passed through blend line 48 until entering heat exchanger 12 under the positive pressure of pump 30. As such, the blend coolant gas, and specifically the recovered coolant gas that was reclaimed, is "recycled" by once again using or employing the blend coolant gas and/or the recovered coolant gas within heat exchanger 12 to cool the optical fiber.

When coolant gas is recycled using system 10, the concentration of the blend coolant gas can be predetermined and the flow rate of the blend coolant gas into heat exchanger 12 can remain substantially constant. For example, if the recovered coolant gas contains a relatively high contaminant concentration, then less of the recovered coolant gas and more of the virgin coolant gas are blended together to produce the mixture possessing the desired level of contaminants. Conversely, if the recovered coolant gas contains a relatively low contaminant concentration, then more of the recovered coolant gas and less of the virgin coolant gas are blended together to produce the mixture possessing the desired level of contaminants.

Additionally, because the steps of recovering and reclaiming coolant gas can be performed repeatedly within system 10, it is important to note that the lower the flow of reclaimed coolant gas the lower the contaminant concentration that will be entrained in the recovered coolant gas.

Also, no matter what the ratio of reclaimed coolant gas to virgin coolant gas may be when the blend coolant gas having the predetermined contaminant concentration is produced, the flow rate of the blend coolant gas into heat exchanger 12 can stay the same or substantially the same. Thus, the flow rate of the blend coolant gas into heat exchanger 12 does not depend upon the contaminant concentration in the recovered or reclaimed coolant gas.

Preferably, the amount of recovered coolant gas that is reclaimed and used to produce the blended coolant gas is optimized to ensure that the maximum amount of recovered coolant gas is reclaimed and then recycled. In one embodiment, optimization can be achieved by solving a system of flow and concentration equations. Such optimization, with reference to FIG. 1, is described below.

First, the impurity concentration of the recovered coolant gas, $y_r$, is determined by analyzer 36. Then, mass flow controller 42 receives the virgin coolant gas flowing at $f_v$ and having impurity concentration $y_v$, and mass flow controller 40 receives the recovered coolant gas flowing at $f_r$ and having impurity concentration $y_r$. Blending section 18 operates such that the blended coolant gas having flow $f_p$ with impurity $y_p$ is produced. The blended coolant gas flow $f_p$ can be determined by:

$$f_p = f_v + f_r \quad (1)$$

while the impurity concentration $y_p$ of the blended coolant gas is governed by:

$$y_p f_p = y_v f_v + y_r f_r \quad (2)$$

Having or knowing desired values for $f_p$ and $y_p$, ascertaining $y_r$ with analyzer 36, and knowing the impurity concentration within virgin coolant gas $y_v$, both $f_r$ and $f_v$ can be solved for using the blended coolant gas flow and impurity concentration equations (1) and (2). As a result, $f_p$ at a desired concentration $y_p$ can be achieved by manipulating the recovered coolant gas flow $f_r$ and virgin coolant gas flow $f_v$ according to the equations:

$$f_r(y_r) = f_p \frac{y_p - y_v}{y_r - y_v}$$

$$f_v(y_r) = f_p \frac{y_r - y_p}{y_r - y_v}$$

Since the impurity concentration of the recovered coolant gas $y_r$ was found to be dependent upon suction flow $f_s$ in recovery line 32a when $f_s$ is less than $f_r$, the $y_r$ dependence on $f_s$ can be directly determined by introducing virgin coolant gas that is 100% pure (e.g., substantially free of or lacking contaminants) into heat exchanger 12 such that:

$$y_p = y_v = 0$$

The resulting impurity concentration of the recovered coolant gas $y_r$ can then be measured for varying $f_s$ values such that:

$$y_r^0 = y_r^0(f_s)$$

Then, the impurity concentration of the recovered coolant gas $y_r$ fulfills:

$$y_r(f_s) = y_p + (1 - y_p) y_r^0(f_s)$$

Figure 3:
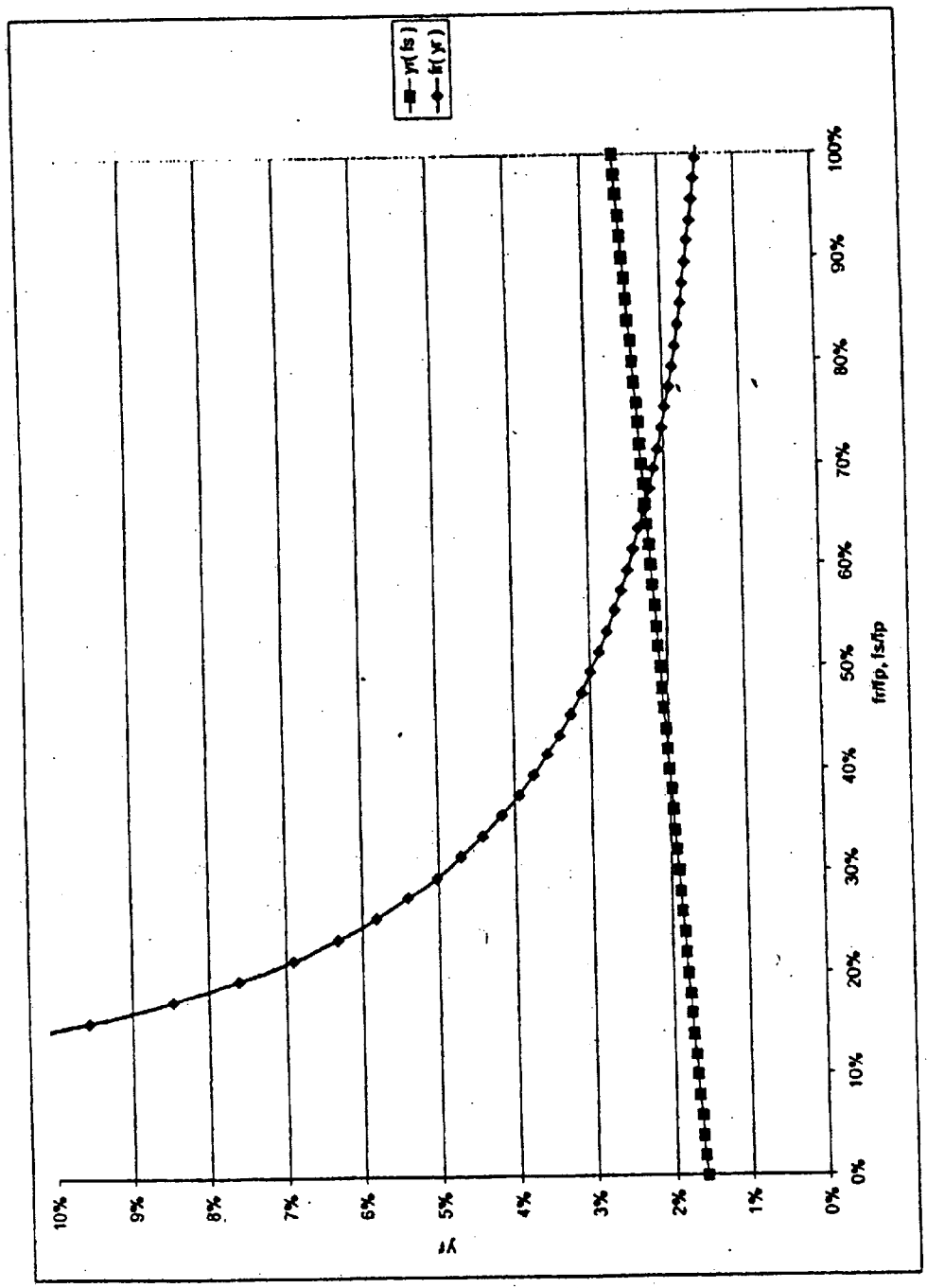
FIG. 3 illustrates a chart detailing the optimum flow of recycled coolant gas that achieves maximum cooling gas recovery while minimizing the contaminants in the recovered coolant gas using the system of FIG. 1.

Referring to FIG. 3, the dependencies $y_r(f_s)$ and $f_r(y_r)$ are illustrated. At the maximum recovery rate, each equation:

$$f_r(y_r) = f_p \frac{y_p - y_v}{y_r - y_v}$$

is fulfilled and, therefore, the optimum recovered gas flow, $f_r^{opt}$, with the impurity concentration, $y_r^{opt}$, occurs at the intersection point of the two curves produced when the above equations are solved. Thus, the optimum recovered gas flow at the optimum concentration can be achieved.

When employed, system 10 can provide numerous advantages. For example, system 10 can continually maintain an increased or elevated rate of coolant gas recovery and can reduce contamination in the recovered coolant gas by reducing suction flow. Further, system 10 can insure and/or promote a constant flow of coolant gas, $f_p$, at a constant concentration. In other words, there is typically no "toggling" between only virgin gas and blended gas. Additionally, the use of system 10 can avoid the need for a variable speed pump, blower, or other means for controlling suction pressure. System 10 does not require coolant gas venting in order to control the fiber-cooling process and no pressure or vacuum measurements need to be taken. Notably, each of these advantages is accomplished without unnecessary or extraneous equipment added to, or employed within, system 10.

Despite any methods being outlined in a step-by-step sequence, the completion of acts or steps in a particular chronological order is not mandatory. Further, elimination, modification, rearrangement, combination, reordering, or the like, of acts or steps is contemplated and considered within the scope of the description and appended claims.

While the present invention has been described in terms of the preferred embodiment, it is recognized that equivalents, alternatives, and modifications, aside from those expressly stated, are possible and within the scope of the appended claims.

What is claimed is:

1. A method of recovering and recycling a coolant gas containing contaminants, the method comprising:

providing a heat exchanger and an analyzer, the heat exchanger and the analyzer in operational association;

recovering the coolant gas containing contaminants from the heat exchanger;

delivering an analysis portion of the recovered coolant gas to the analyzer;

analyzing the analysis portion of the recovered coolant gas with the analyzer to determine a condition of the recovered coolant gas;

blending, based on the condition, a reclaimed portion of the recovered coolant gas and a virgin coolant gas to produce a gaseous coolant blend having a predetermined contaminant concentration; and introducing the gaseous coolant blend into the heat exchanger such that at least a portion of the recovered coolant gas is recycled; and, maintaining a flow of a portion of said recovered coolant gas through a by-pass section while simultaneously decreasing the flow of said recovered portion of coolant gas through said by-pass section and increasing the flow of said reclaimed coolant gas through said blending section, thereby reducing lag time.

2. The method of claim 1, wherein the method further comprises a step of introducing the virgin coolant gas into the heat exchanger prior to the recovering step.

3. The method of claim 1, wherein the recovering step and the delivering step are performed by a single pump.

4. The method of claim 1, wherein the method further comprises providing the analysis portion of the recovered coolant gas to a seal associated with the heat exchanger.

5. The method of claim 1, wherein the method further comprises providing a seal for the heat exchanger using the recovered coolant gas.

6. The method of claim 1, wherein the method further comprises providing a control system, the control system associated with the analyzer and operable to control the blending.

7. The method of claim 1, wherein the analysis portion of the recovered coolant gas passes through the analyzer at a constant rate of flow.

8. The method of claim 1, wherein the gaseous coolant blend is introduced into the heat exchanger at a constant rate of flow.

9. The method of claim 1, wherein the method further comprises providing means for controlling an amount of contaminants introduced into the heat exchanger.

10. The method of claim 1, wherein the method further comprises providing means for controlling a contaminant concentration in the gaseous coolant blend.

11. The method of claim 1, wherein the method further comprises providing means for controlling a contaminant concentration in the gaseous coolant blend introduced into the heat exchanger.

12. The method of claim 1, wherein the method further comprises dividing the recovered coolant gas into a portion of the recovered coolant gas that includes the analysis portion of the recovered coolant gas and the reclaimed portion of the recovered coolant gas.

13. The method of claim 1, wherein the predetermined contaminant concentration of the gaseous coolant blend is user defined.

14. A method of controlling a contaminant concentration in a gaseous coolant blend provided to a heat exchanger, the method comprising:

providing the heat exchanger and an analyzer, the heat exchanger and the analyzer in operational association;

recovering a coolant gas containing contaminants from the heat exchanger;

delivering an analysis portion of the recovered coolant gas to the analyzer;

analyzing the analysis portion of the recovered coolant gas with the analyzer to determine the contaminant concentration within the recovered coolant gas; and blending, based on the contaminant concentration, a reclaimed portion of the recovered coolant gas and a virgin coolant gas to produce the gaseous coolant blend;

recycling the reclaimed portion of the recovered coolant gas by introducing the gaseous coolant blend into the heat exchanger such that the contaminant concentration in the gaseous coolant blend provided to the heat exchanger is controlled; and introducing a portion of said recovered coolant gas into a by-pass section, said by-pass section providing a seal to said heat exchanger and ensuring continuous operation of the pump.

* * * * *